US011797104B2

(12) United States Patent
Azarov et al.

(10) Patent No.: US 11,797,104 B2
(45) Date of Patent: Oct. 24, 2023

(54) ELECTRONIC DEVICE AND CONTROL METHOD OF THE SAME

(71) Applicant: SAMSUNG ELECTRONICS CO., LTD., Suwon-si (KR)

(72) Inventors: Hennadii Azarov, Kiev (UA); Iliya Degtyarenko, Kiev (UA); Oleksandr Ivanov, Kiev (UA); Kirill Kleshch, Kiev (UA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/748,413

(22) Filed: May 19, 2022

(65) Prior Publication Data
US 2022/0357805 A1 Nov. 10, 2022

Related U.S. Application Data

(63) Continuation of application No. PCT/KR2022/003674, filed on Mar. 16, 2022.

(30) Foreign Application Priority Data

May 6, 2021 (KR) .................. 10-2021-0058430

(51) Int. Cl.
*G06F 3/0346* (2013.01)
*G06T 7/70* (2017.01)
(Continued)

(52) U.S. Cl.
CPC .......... *G06F 3/0346* (2013.01); *G06F 3/017* (2013.01); *G06T 7/70* (2017.01); *G06T 15/00* (2013.01)

(58) Field of Classification Search
CPC ........ G06F 3/0346; G06F 3/017; G06F 3/011; G06T 7/70; G06T 15/00
See application file for complete search history.

(56) References Cited

U.S. PATENT DOCUMENTS 8,922,530 B2 12/2014 Pance
2017/0131802 A1* 5/2017 Yeh .................... G06F 3/046
(Continued)

FOREIGN PATENT DOCUMENTS

JP 2009-80745 A 4/2009
JP 2013-125487 A 6/2013
(Continued)

OTHER PUBLICATIONS

International Search Report dated Jul. 5, 2022, issued by the International Searching Authority in International Application No. PCT/KR2022/003674 (PCT/ISA/210).

*Primary Examiner* — Grant Sitta
(74) *Attorney, Agent, or Firm* — Sughrue Mion, PLLC

(57) ABSTRACT

The electronic device according to an embodiment includes: an input device; and a mobile device configured to communicate with the input device, wherein the mobile device determines a position of the mobile device or a position of a first external device as reference coordinates, receives relative position information of the input device, with respect to the reference coordinates, and motion information of the input device, determines a movement trajectory based on the relative position information and the motion information, and displays the movement trajectory or transmits the movement trajectory to a second external device.

19 Claims, 12 Drawing Sheets

(51) Int. Cl.
    *G06T 15/00*     (2011.01)
    *G06F 3/01*     (2006.01)

(56) References Cited

U.S. PATENT DOCUMENTS

| | | |
|---|---|---|
| 2017/0147274 A1 | 5/2017 | Oh et al. |
| 2017/0192493 A1* | 7/2017 | Ofek .................. G06F 3/04883 |
| 2020/0042111 A1 | 2/2020 | Connellan et al. |
| 2020/0050350 A1 | 2/2020 | Lee et al. |
| 2020/0319704 A1 | 10/2020 | Kathuria et al. |
| 2021/0048897 A1 | 2/2021 | Munakata et al. |
| 2022/0066577 A1* | 3/2022 | Watanabe ........... G06F 3/04162 |

FOREIGN PATENT DOCUMENTS

| | | |
|---|---|---|
| KR | 10-1515986 B1 | 5/2015 |
| KR | 10-2017-0039345 A | 4/2017 |
| KR | 10-2017-0058671 A | 5/2017 |
| KR | 10-2020-0017267 A | 2/2020 |
| KR | 10-2020-0096901 A | 8/2020 |
| WO | 2019/220803 A1 | 11/2019 |

* cited by examiner

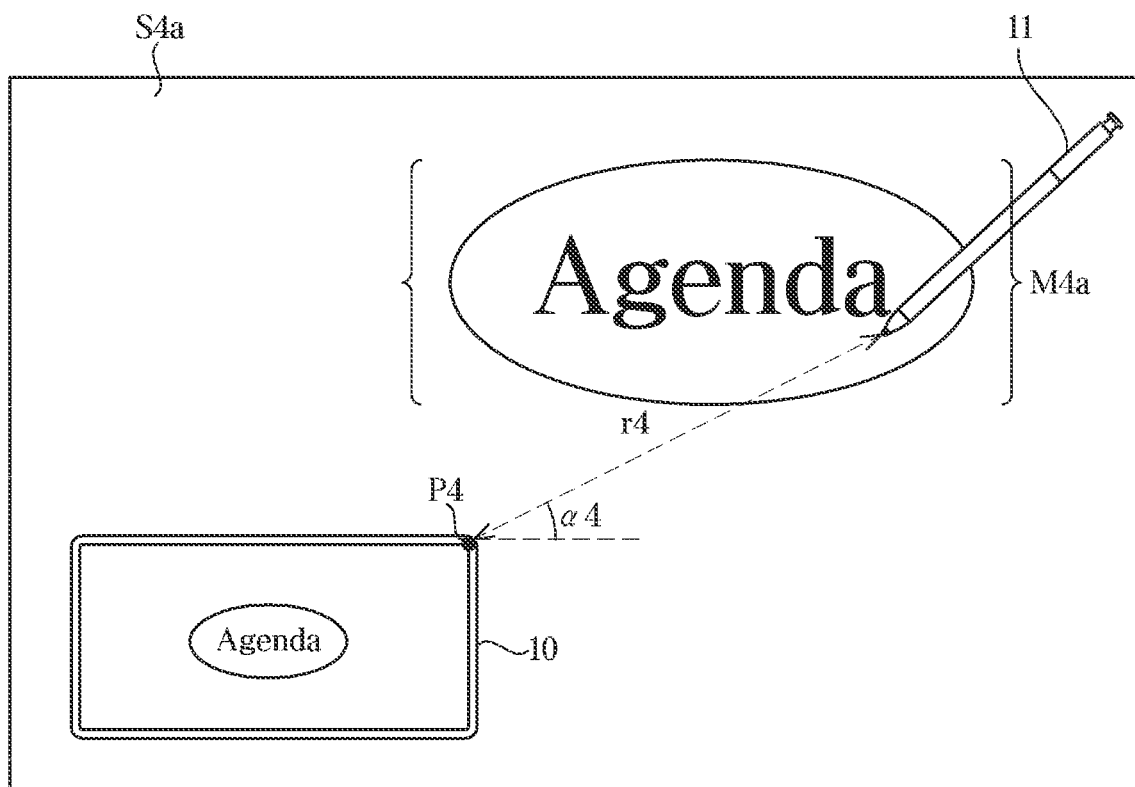

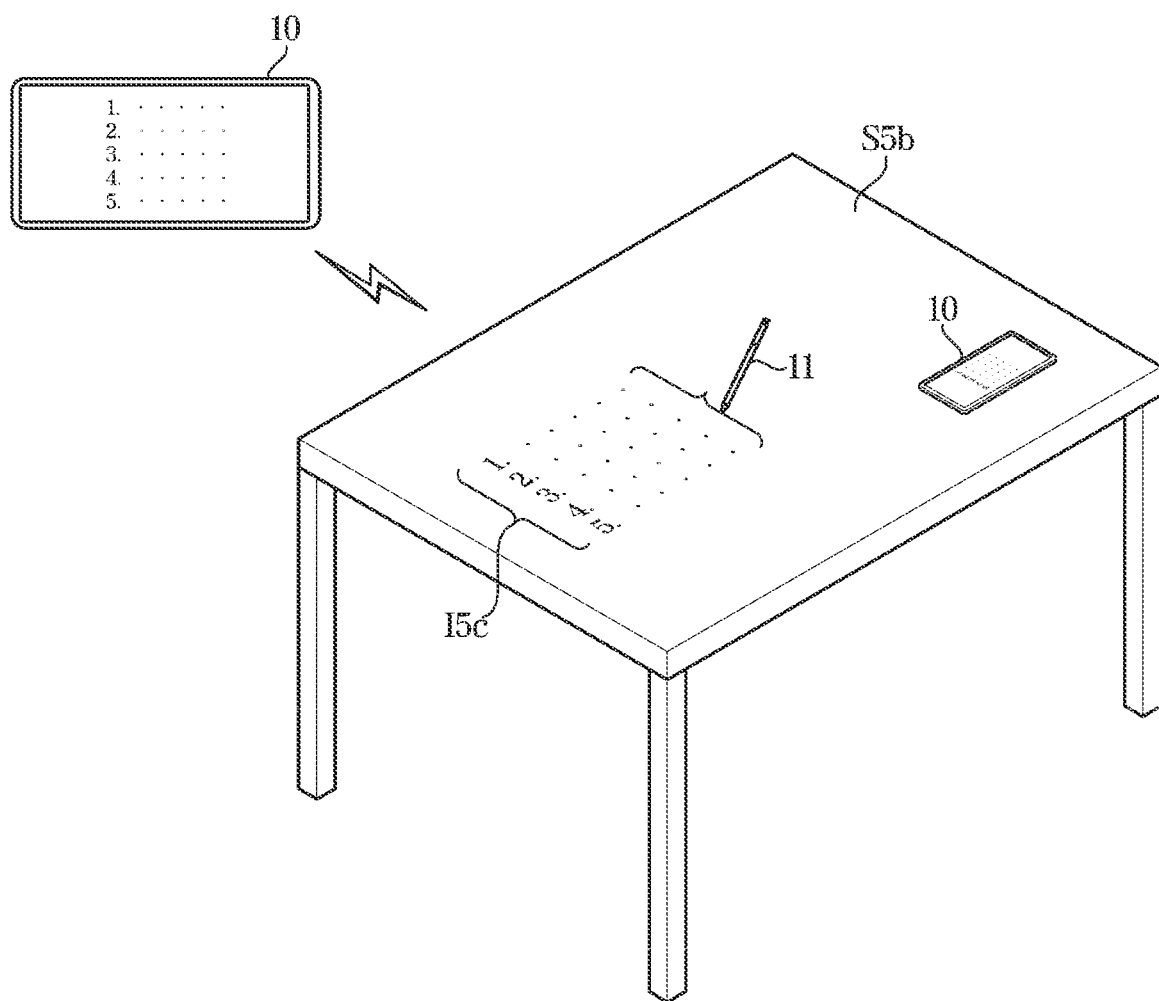

FIG. 7
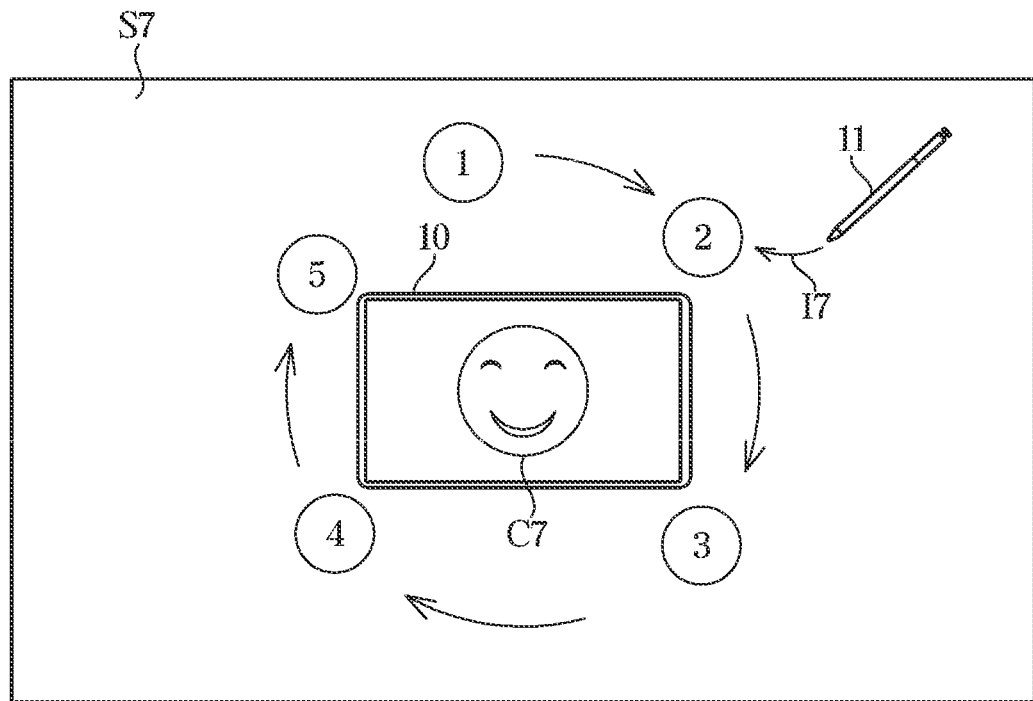
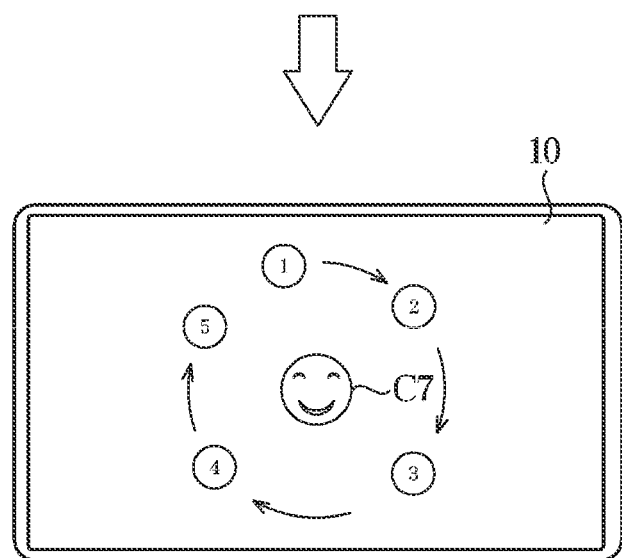

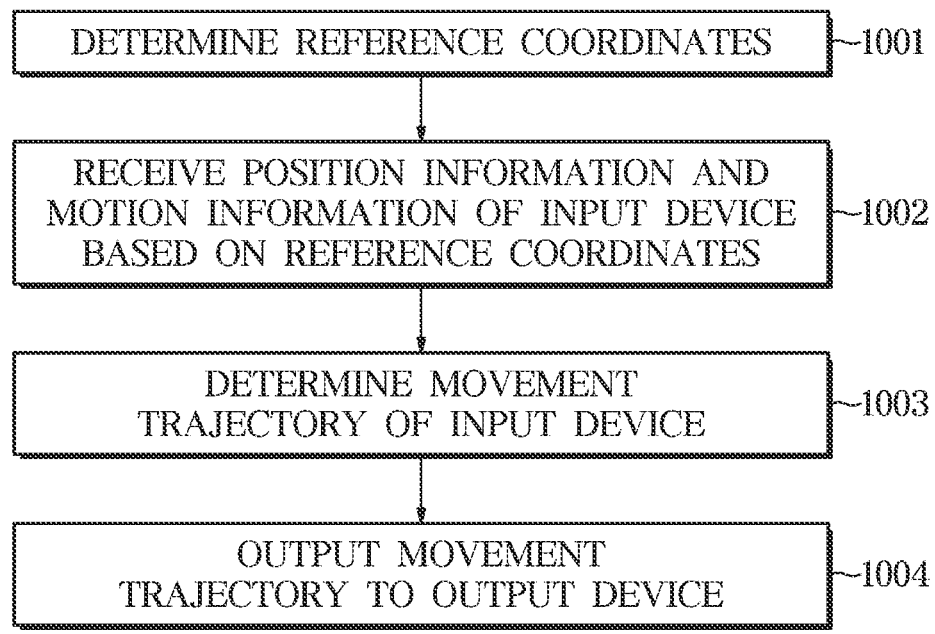

ELECTRONIC DEVICE AND CONTROL METHOD OF THE SAME

CROSS-REFERENCE TO RELATED APPLICATION(S)

This application is a by-pass continuation application of International Application No. PCT/KR2022/003674, filed Mar. 16, 2022, which claims priority from Korean Patent Application No. 10-2021-0058430, filed on May 6, 2021 in the Korean Intellectual Property Office, and all the benefits accruing therefrom under 35 U.S.C. 119, the disclosures of which are herein incorporated by reference in their entireties.

BACKGROUND

1. Technical Field

The present disclosure relates to an electronic device including an input device such as a stylus pen and a mobile device and a method of controlling the electronic device.

2. Description of the Related Art

A mobile device (user terminal) is a portable device that has at least one of the following functions: a function of performing voice and video calls, a function of inputting or outputting information, and a function of storing data.

As the functions of such mobile devices are diversified, the mobile devices have been developed to have complex functions such as taking photos and videos, reproducing music or video files, playing games, receiving broadcasts, and wireless Internet.

Also, for user convenience, mobile devices have also been implemented such that the operation of the mobile devices may be controlled by using an input device such as a stylus pen.

Meanwhile, in a case where a user inputs a command using an input device not directly onto the surface (e.g., a touch screen) of the mobile device but in a space where the mobile device is not provided by forming a gesture or by generating a trajectory, it is difficult to determine a reference position for the user's gesture or trajectory, which makes it difficult for the mobile device to recognize an input signal using the input device.

Particularly, in a virtual reality (VR) or augmented reality (AR) technology that has been realized in recent years by using a separate device, it is difficult to input a command or display a trajectory using an input device associated with a mobile device used by a user.

The present disclosure provides an electronic device that may output a trajectory formed using an input device in an area other than a mobile device (or an area around the mobile device) without performing an additional operation of setting a position of a user or a complicated calculation for defining a neighboring space of the mobile device, a method of controlling the electronic device, and the mobile device.

SUMMARY

According to an aspect of an example embodiment, provided is an electronic device including: an input device; and a mobile device configured to communicate with the input device, wherein the mobile device is further configured to: determine a position of the mobile device or a position of a first external device as reference coordinates; receive relative position information of the input device, with respect to the reference coordinates, and motion information of the input device; determine a movement trajectory of the input device based on the relative position information and the motion information; and display the movement trajectory or transmit the movement trajectory to a second external device.

The mobile device may be further configured to: determine at least one planar space including the reference coordinates; and determine the movement trajectory of the input device based on the relative position information and the motion information on the at least one planar space.

The mobile device may be further configured to determine the position of the first external device as the reference coordinates; determine spatial coordinates including the reference coordinates, and display or transmit the movement trajectory based on the spatial coordinates.

The mobile device may be further configured to generate a visual form of the movement trajectory, and output, to the second external device, the visual form of the movement trajectory.

The mobile device may be further configured to: determine three-dimensional spatial coordinates including the reference coordinates; and generate a visual form of the movement trajectory, and output, to the second external device, the visual form of the movement trajectory on the three-dimensional spatial coordinates.

The mobile device may be further configured to: determine spatial coordinates including an image of a content that is output by the mobile device; determine a position relation between the image of the content and the movement trajectory corresponding to a relative position relation between the mobile device and the input device; and simultaneously output the image of the content and the movement trajectory on at least one of the mobile device or the second external device.

The mobile device may be further configured to determine the relative position information of the input device based on signals transmitted and received between the mobile device and the input device, and configured to output the determined relative position information on the mobile device.

According to an aspect of an example embodiment, provided is an electronic device communicatively coupled with an input device, the electronic device including: a display; a communicator configured to receive motion information of the input device from the input device; and a controller configured to: determine a position of the electronic device or a position of an anchor device as reference coordinates; determine relative position information of the input device, with respect to the reference coordinates, based on signals transmitted and received between the input device and the communicator; determine a movement trajectory of the input device based on the relative position information and the motion information; and display the movement trajectory on the display or transmit the movement trajectory to an output device.

The communicator may be further configured to receive a direction signal from the anchor device, the direction signal indicating a direction of the input device with respect to the anchor device, and the controller may be further configured to determine the position of the anchor device as the reference coordinates based on the direction signal and signals transmitted and received between the anchor device and the communicator.

The controller may be further configured to control the display to display a visual form of the movement trajectory.

The controller may be further configured to: determine three-dimensional spatial coordinates including the reference coordinates, and control the display to display the visual form of the movement trajectory.

The controller may be further configured to determine the relative position information of the input device and output the determined relative position information on the display.

According to an aspect of an example embodiment, provided is a method of controlling an electronic device, the method including: determining a position of a mobile device or a position of a first external device as reference coordinates; receiving relative position information of an input device, with respect to the reference coordinates, and motion information of the input device; determining a movement trajectory of the input device based on the relative position information and the motion information; and displaying the movement trajectory or transmitting the movement trajectory to a second external device.

The determining of the movement trajectory of the input device may include: determining at least one planar space including the reference coordinates; and determining the movement trajectory based on the relative position information and the motion information on the at least one planar space.

The determining of the reference coordinates may include determining a position of the first external device as the reference coordinates and determining spatial coordinates including the reference coordinates, and the displaying or the transmitting the movement trajectory may be performed based on the spatial coordinates.

The transmitting of the movement trajectory to the second external device may include generating a visual form of the movement trajectory and transmitting the visual form of the movement trajectory to the second external device.

The transmitting of the movement trajectory to the second external device may include: determining three-dimensional spatial coordinates including the reference coordinates; and generating a visual form of the movement trajectory on the three-dimensional spatial coordinates and transmitting the visual form of the movement trajectory to the second external device.

The method may further include determining spatial coordinates including an image of a content that is output by the mobile device; determining a position relation between the image of the content and the movement trajectory corresponding to a relative position relation between the mobile device and the input device; and simultaneously outputting the image of the content and the movement trajectory on at least one of the mobile device or the second external device.

The method may further include determining the relative position information of the input device based on signals transmitted and received between the mobile device and the input device, and outputting the relative position information on the mobile device.

According to an electronic device and a method of controlling the electronic device according to an embodiment, a trajectory formed using an input device in an area other than a mobile device may be output without performing an additional operation of setting a position of a user or a complicated calculation.

BRIEF DESCRIPTION OF THE DRAWINGS

The above and/or other aspects will become apparent and more readily appreciated from the following description of example embodiments, taken in conjunction with the accompanying drawings in which:

FIGS. 4A and 4B are diagrams for describing an operation of obtaining a motion trajectory of an input device according to an embodiment;

FIGS. 5A, 5B, and 5C are diagrams for describing an operation of outputting a motion trajectory of an input device in a two-dimensional operation according to an embodiment;

FIG. 7 is a diagram for describing an operation of simultaneously outputting an image output by a mobile device and a motion trajectory of an input device according to an embodiment;

FIG. 9 is a flowchart illustrating a method of operating an electronic device according to an embodiment.

DETAILED DESCRIPTION

Figure 1:
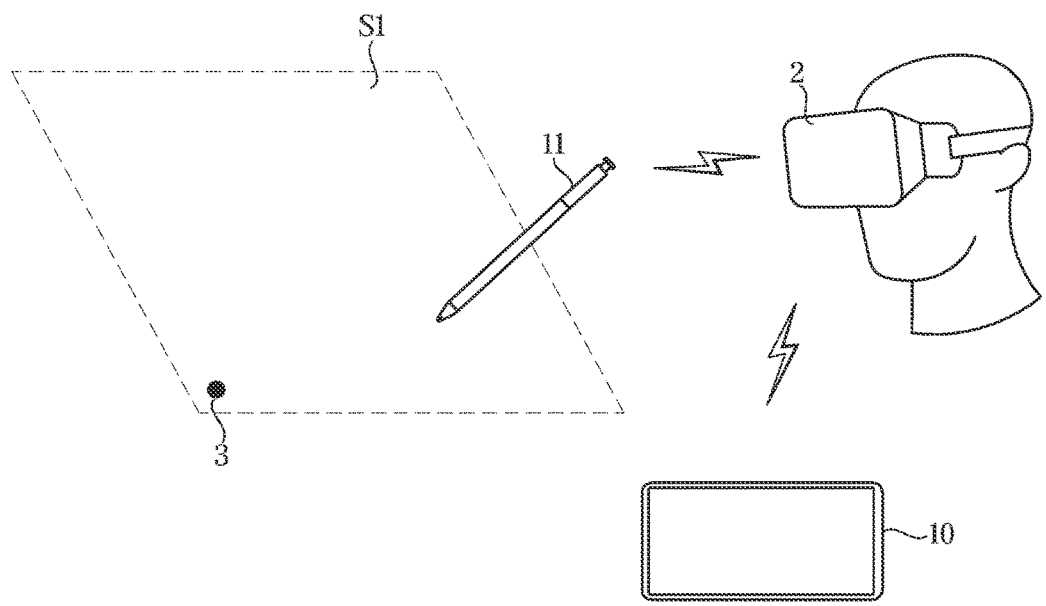
FIG. 1 is a diagram schematically illustrating operations of an input device and a mobile device according to an embodiment.

Hereinafter, operating principles and embodiments of the present disclosure will be described with reference to the accompanying drawings. Throughout the specification, like reference numerals refer to like elements throughout. This specification does not describe all elements of the embodiments of the present disclosure and detailed descriptions on what are well known in the art or redundant descriptions on substantially the same configurations may be omitted. The terms 'unit, module, member, and block' used herein may be implemented using a software or hardware component. According to an embodiment, a plurality of 'units, modules, members, and blocks' may also be implemented using an element and one 'unit, module, member, and block' may include a plurality of elements.

Throughout the specification, when an element is referred to as being "connected to" another element, it may be directly or indirectly connected to the other element and the "indirectly connected to" includes connected to the other element via a wireless communication network.

Also, it is to be understood that the terms "include" or "have" are intended to indicate the existence of elements disclosed in the specification, and are not intended to preclude the possibility that one or more other elements may exist or may be added.

Throughout the specification, it will be understood that when one element, is referred to as being "on" another element, it can be directly on the other element, or intervening elements may also be present therebetween.

Throughout the specification, terms "first", "second", and the like are used to distinguish one component from another, and the components are not limited by these terms.

An expression used in the singular encompasses the expression of the plural, unless otherwise indicated.

The reference numerals used in operations are used for descriptive convenience and are not intended to describe the order of operations and the operations may be performed in a different order unless the order of operations are clearly stated.

The present disclosure will now be described more fully with reference to the accompanying drawings for one of ordinary skill in the art to be able to perform the present disclosure without any difficulty.

The present disclosure may, however, be embodied in many different forms and should not be construed as being limited to the embodiments of the present disclosure set forth herein. In the drawings, portions unrelated to the descriptions are omitted for clear description of the disclosure for clarity and the same or similar elements are denoted by the same reference numerals throughout the specification.

FIG. 1 is a diagram schematically illustrating an example of a mobile device 10 including an input device 11 according to an embodiment. Referring to FIG. 1, operations of the input device 11 and the mobile device 10 according to an embodiment will be described.

In the present disclosure, the input device 11 may be provided as a "stylus pen" that is a pen-shaped tool used to control the mobile device 10.

A user may control the mobile device 10 by performing an operation using the input device 11. For example, the user may perform an operation (e.g., tap or drag) directly on the display of the mobile device 10 using the input device 11 or a click of a button provided at the input device 11.

Referring to FIG. 1, the mobile device 10 may include a touch screen and the input device 11. Also, in an embodiment, the mobile device 10 may include a slot into which the input device 11 is inserted.

The mobile device 10 may be implemented using various electronic devices including a touch screen such as a mobile phone, a smart phone, a tablet personal computer (PC), a personal digital assistant (PDA), a portable multimedia player (PMP), and a digital camera, but is not limited thereto.

The input device 11 may include a clickable button. In an embodiment, the user may control the mobile device 10 by clicking the button provided at the input device 11 in various methods. A method of clicking the button may include, a single click, a double click, a long click, and the like, without being limited thereto.

The input device 11 may receive an input of clicking the button.

The input device 11 may transmit a control signal corresponding to the received input to the mobile device 10.

The input device 11 may transmit the control signal to the mobile device 10 using a communication channel formed between the input device 11 and the mobile device 10.

In addition, the input device 11 may include a motion sensor configured to detect a motion of the user. In this regard, the motion sensor may include at least one of a magnetic sensor, a position sensor, an acceleration sensor, a gyroscope sensor, and a proximity sensor, without being limited thereto.

In the case where the input device 11 includes the motion sensor, the user may express a certain motion using the input device 11.

Then, the motion sensor of the input device 11 detects the motion of the user, and the mobile device 10 may be controlled based on a signal corresponding to the detected motion of the user.

For example, while a camera application is run in the mobile device 10, a zoom-in operation may be performed in the camera application based on a user's motion of drawing a circle using the input device 11.

In this regard, the input device 11 may transmit a control signal to the mobile device 10 using a short-range wireless communication network including Bluetooth, infrared, and the like.

In an embodiment, based on receiving a user input such as a tap or drag on the touch screen, the mobile device 10 may generate a control signal corresponding to the received user input.

The input device 11 may include a battery. When the input device 11 is inserted into the slot of the mobile device 10, the battery of the input device 11 may be connected to a power supply circuit in the mobile device 10 to charge the battery of the input device 11.

Referring to FIG. 1, an anchor device 3 may be provided to determine a plane S1 of a movement trajectory of the input device 11.

A writing plane (or a virtual writing plane) may be determined based on the anchor device 3 or the mobile device 10.

The anchor device 3 may be placed on one plane (e.g., by a user's operation) and a plane on which the anchor device 3 is placed may be determined as a writing plane.

In addition, the anchor device 3 may include a magnetometer, a gyro sensor, and/or any other position sensor(s).

The anchor device 3 may track coordinates of the input device 11 on the writing plane with respect to a position of the anchor device 3 based on the sensors.

The anchor device 3 may include a direction detection sensor module (or a direction detection sensor).

The direction detection sensor module may detect a direction of the input device 11 with respect to the anchor device 3.

In an embodiment, the anchor device 3 may be used to determine a reference position with respect to the writing plane for an input by the input device 11.

Specifically, an electronic device including the mobile device 10 and the input device 11 may determine a position of the anchor device 3 as a reference position and a plane on which the anchor device 3 is placed as a writing plane.

In addition, as will be described later, the motion trajectory of the input device 11 that is input to a space (e.g., defined based on the writing plane) may be transmitted to an output device 2 (see FIG. 2) to be output.

Specifically, the electronic device may communicate with the output device 2. The electronic device may include the mobile device 10 and the input device 11.

The mobile device 10 may determine the motion trajectory of the input device 11 based on a distance obtained by using a communication time therebetween and angles of transmitted and received signals (an angle of arrival (AoA) and an angle of departure (AoD)) and may transmit the determine the motion trajectory to the output device 2.

Upon receiving the motion trajectory, the output device 2 may output information of the motion trajectory.

Hereinafter, an operation of receiving the movement trajectory from the input device performed by the mobile device will be described in detail.

Figure 2:
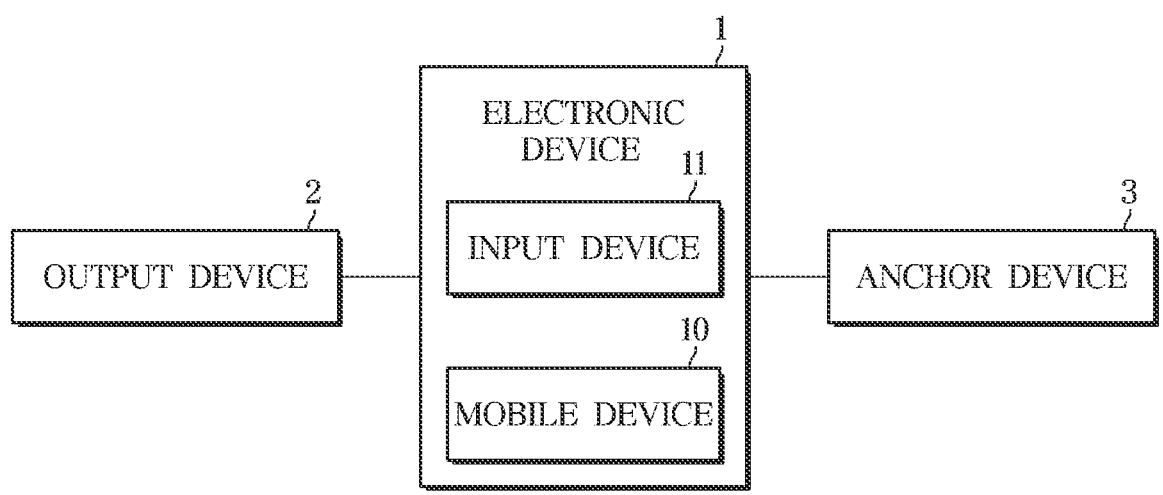
FIGS. 2 and 3 are block diagrams of an electronic device according to an embodiment.
Figure 3:
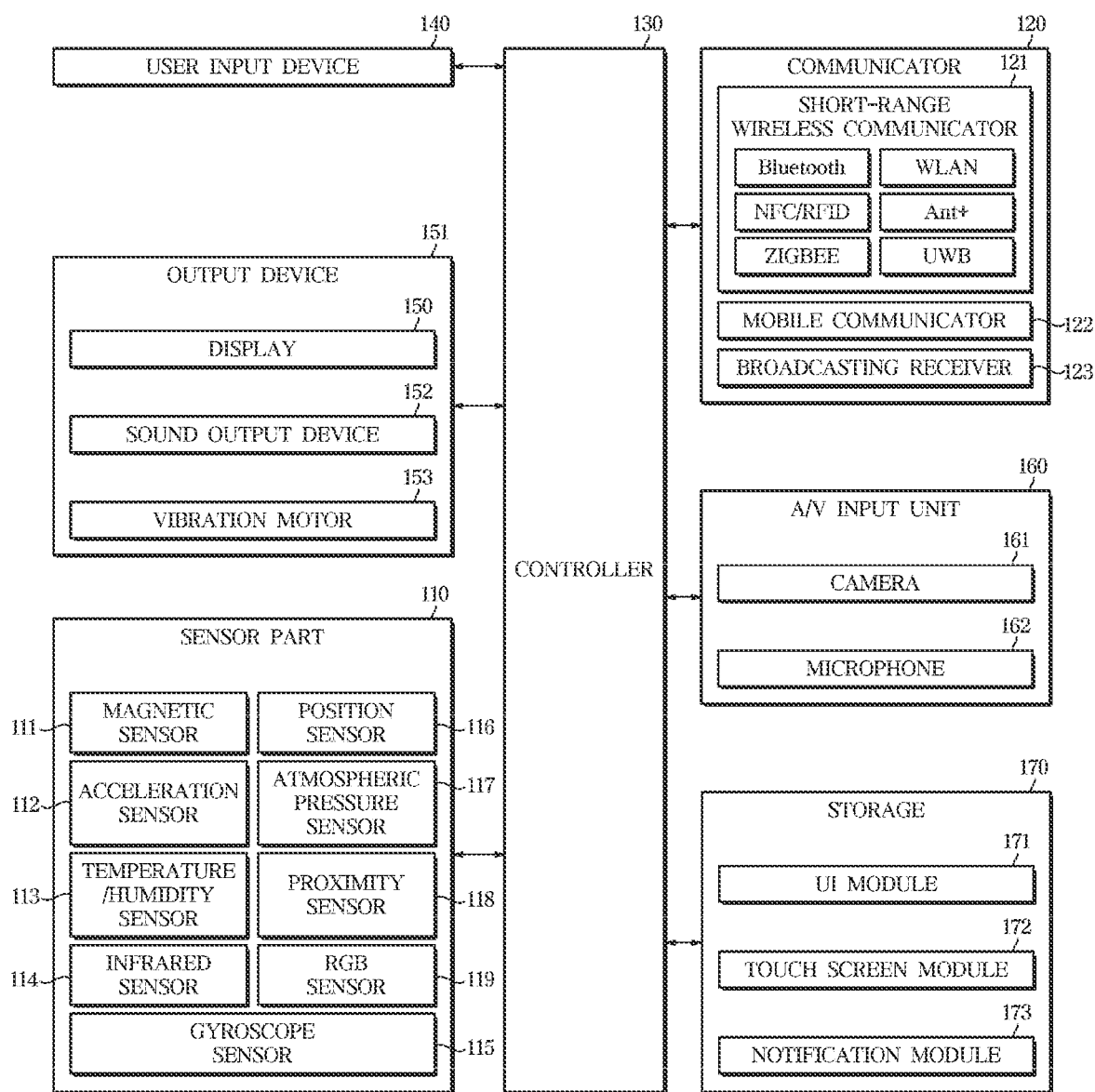

FIGS. 2 and 3 are block diagrams illustrating an electronic device according to an embodiment.

FIG. 2 is a control block diagram illustrating relations between an electronic device 1 and other external devices 2 and 3 according to an embodiment.

Referring to FIG. 2, the electronic device 1 may include the input device 11 and the mobile device 10.

The electronic device 1 may determine a position of the mobile device 10 or a position of the anchor device 3 as reference coordinates in determining the writing plane. Hereinafter, an operation of a case in which the anchor device 3 is used to determine the reference coordinates will be described.

Throughout the specification, the anchor device 3 may refer to a first external device.

The electronic device 1 may receive relative position information of the input device 11, based on the reference coordinates, and motion information of the input device 11.

The relative position information may refer to information on a position of the input device with respect to the anchor device 3 or the mobile device 10 (or a position of the input device with respect to the reference coordinates determined based on the anchor device 3 or the mobile device 10).

The embodiment will be described based on an operation of an anchor device provided as another mobile (or portable) device according to an embodiment. However, embodiments are not limited thereto and the anchor device may not be provided as an external device as in FIG. 2 but may be provided as the mobile device 10 (that is, the mobile device 10 serves the function of the anchor device and determines the reference coordinates).

Specifically, the anchor device 3 may include a magnetometer, a gyro sensor, and/or other position sensor(s).

The mobile device 10 or the anchor device 3 may determine the relative position information of the input device 11 by obtaining a distance to the input device 11 by using a communication time between the mobile device 10 or the anchor device 3 and the input device 11 and angles of transmitted and received signals using such sensors.

The motion information may include a command to output information on a motion of the input device 11 moved by the user on a user interface (e.g., graphic user interface) of the mobile device.

For example, when the input device 11 horizontally moves, motion information corresponding thereto may include a command to output, to the mobile device 10 or the output device 2, information on the movement of the input device 11 as an image indicating a horizontal movement (e.g., a horizontal arrow).

A movement trajectory corresponding to the motion information (e.g., a horizontal arrow) may indicate that the input device 11 moves horizontally.

The movement trajectory or motion trajectory may mean an image output based on the motion information.

The electronic device 1 may determine the movement trajectory of the input device 11 based on the relative position information and the motion information of the input device 11.

The electronic device may include the mobile device and the input device.

The mobile device may determine the motion trajectory of the input device based on the distance obtained using a communication time therebetween and the angles of transmitted and received signals and may determine the movement trajectory based on the determined motion trajectory.

The movement trajectory may be displayed on a display of the mobile device 10 or transmitted to the output device 2 to be output.

The mobile device 10 may communicate with the output device 2.

The mobile device 10 may transmit the movement trajectory determined by the above-described operation to the output device 2.

Specifically, the mobile device 10 may generate the movement trajectory based on the motion information and output the movement trajectory to the output device 2.

The output device 2 that has received the movement trajectory may output the contents.

The output device 2 may be provided as a second external device in the present disclosure.

The electronic device 1 may determine at least one planar space including the reference coordinates and determine the movement trajectory of the input device 11 based on the relative position information and the motion information on the planar space.

That is, in the case where the anchor device 3 defines one plane, the electronic device 1 may receive the movement trajectory as an input based on movement of the input device 11 on the plane.

Specifically, the anchor device may determine a surface on which the anchor device is placed as a plane. The anchor device may be provided such that at least one side is in contact with a predetermined plane.

In this case, the anchor device may determine the plane as a plane on which writing is performed.

The anchor device 3 may include a direction detection sensor module.

The direction detection sensor module may be provided as an acceleration sensor, a gyro sensor, and/or a magnetometer.

The direction detection sensor module may track a relative position of the input device 11 with respect to the mobile device 10 or the anchor device 3.

The anchor device 3 may determine a reference position of the writing plane for an input performed by the input device 11.

The writing plane may mean a reference plane to receive an input of the above-described motion information of the input device.

The writing plane may be determined as a plane on which the anchor device 3 or the mobile device 10 is placed.

In addition, in determining the writing plane, the position of the anchor device 3 or the mobile device 10 may be determined as the reference position.

According to an embodiment, the mobile device 10 may serve as the anchor device 3.

Although the anchor device 3 and the electronic device 1 are provided as separate elements in FIG. 2, the mobile device 10 may serve as the anchor device 3 according to an embodiment.

The output device 2 may be provided as a device configured to output an image.

Specifically, the output device 2 may be provided as a display device implementing augmented reality (AR), mixed reality (MR), and virtual reality (VR) without limitation as long as the display device outputs an image.

The output device 2 according to an embodiment may be provided as an AR device.

The AR device, as a device capable of showing augmented reality, generally refers to an augmented reality device in the form of glasses worn on a face of the user, a head mounted display apparatus (HMD) worn on the user's head, an augmented reality helmet, and the like.

The mobile device 10 may visualize the motion trajectory and output the visualized result on the display device.

When the output device 2 is provided as a device configured to implement augmented reality (AR), mixed reality (MR), and virtual reality (VR), the output device 2 may include at least one sensor configured to obtain depth position information of the input device 11.

That is, the output device 2 may include a sensor capable of obtaining three-dimensional position information of the input device 11.

Specifically, the output device 2 may include an imaging apparatus such as an RGB camera, a depth camera, and an infrared camera and a sensor such as a Radar sensor and a Lidar sensor.

In this case, three-dimensional position or motion information of the input device 11 may be obtained based on devices provided in the electronic device 1 and the output device 2.

That is, the electronic device 1 determines three-dimensional spatial coordinates including the reference coordinates, visualizes the motion trajectory on the three-dimensional spatial coordinates, and outputs the visualized resultant on the output device 2.

The electronic device 1 may determine the spatial coordinates including a contents image output by the electronic device 1, determine mutual position relations between the contents image and the movement trajectory corresponding to a relative position relation between the mobile device 10 and the input device 11, and simultaneously output the contents image and the movement trajectory on at least one of the mobile device 10 and the external device.

The electronic device 1 may determine relative position information of the mobile device 10 and the input device 11 and output the information on the display provided at the mobile device 10. This will be described in more detail below.

FIG. 3 is a control block diagram illustrating the configuration of the mobile device 10 according to an embodiment.

As shown in FIG. 3, the mobile device 10 according to an embodiment may include a sensor part 110, a communicator 120, a controller 130, a user input device 140, and a display 150, and may further include an A/V input device 160 and a storage 170.

Hereinafter, the components will be sequentially described in detail. Regarding the sensor part 110, the communicator 120, and the controller 130, descriptions given above in FIG. 2 will be omitted in FIG. 3.

The sensor part 110 may sense a state of the mobile device 10 or a state around the mobile device 10 and transmit sensed information to the controller 130.

The sensor part 110 may include a motion sensor. Specifically, the sensor part 110 may include at least one of a magnetic sensor 111, an acceleration sensor 112, a temperature/humidity sensor 113, an infrared sensor 114, a gyroscope sensor 115, a position sensor (e.g., GPS) 116, an atmospheric pressure sensor 117, a proximity sensor 118, and an RGB sensor (illuminance sensor) 119, but is not limited thereto. Since functions of these sensors may be intuitively inferred by those of ordinary skill in the art, detailed descriptions thereof will not be given.

The sensor part 110 may sense movement of the mobile device 10, a bio signal of a user of the mobile device 10, and a touch signal input to the mobile device 10.

The communicator 120 may include one or more components for communication between the mobile device 10 and the input device 11 or the external device. For example, the communicator 120 may include a short-range wireless communicator 121, a mobile communicator 122, and a broadcasting receiver 123.

The short-range wireless communicator 121 may include a Bluetooth communicator, a near field communicator, a wireless local area network (WLAN) or Wi-Fi communicator, a Zigbee communicator, an infrared data association (IrDA) communicator, a Wi-Fi Direct (WFD) communicator, an ultra-wideband (UWB) communicator, and an Ant+ communicator, without being limited thereto.

The mobile communicator 122 may transceive wireless signals to and from at least one of a base station, an external terminal, and a server on a mobile communication network.

In this regard, the wireless signals may include various types of data for transceiving audio call signals, video call signals, or text/multimedia messages.

The broadcasting receiver 123 may receive broadcasting signals and/or information related to broadcasting from the outside via broadcasting channels. The broadcasting channels may include satellite channels and terrestrial channels. According to an embodiment, the communicator 120 may not include the broadcasting receiver 123.

The communicator 120 may receive motion information of the input device 11 from the input device 11 including a motion sensor.

In addition, the communicator 120 may be configured to receive a direction signal from the anchor device 3 including a direction detection sensor.

The output device 151 outputs audio signals, video signals, or vibration signals and may include a display 150, a sound output device 152, and a vibration motor 153.

The display 150 displays information processed by the mobile device 10.

In addition, when the display 150 and a touch pad form a layered structure to constitute a touch screen, the display 150 may also be used as an input device as well as an output device. The display 150 may include at least one of a liquid crystal display, a thin film transistor-liquid crystal display, an organic light-emitting diode, a flexible display, a three-dimensional (3D) display, an electrophoretic display.

The sound output device 152 may output audio data received from the communicator 120 or stored in the memory 170.

Also, the sound output device 152 outputs audio signals related to functions processed in the mobile device 10 (e.g., a call signal receiving sound, a message receiving sound, and a notification sound). The sound output device 152 may include a speaker, a buzzer, or the like.

The vibration motor 153 may output vibration signals. For example, the vibration motor 153 may output vibration signals corresponding to outputs of audio data or video data (e.g., a call signal receiving sound and a message receiving sound). In addition, the vibration motor 153 may output a vibration signal when a touch is input onto the touch screen.

The user input device 140 is configured to receive, from a user, data for controlling the mobile device 10. For example, the user input device 140 may be a key pad, a dome switch, a touch pad (e.g., a touch capacitive type touch pad, a pressure resistive type touch pad, an infrared beam sensing type touch pad, a surface acoustic wave type touch pad, an integral strain gauge type touch pad, and a piezo electric type touch pad), a jog wheel, a jog switch, or the like, but is not limited thereto.

The audio/video (A/V) input device 160 is configured to input audio signals or video signals and may include a camera 161 and a microphone 162. The camera 161 may obtain image frames such as still images or moving images via an image sensor in a video call mode or an image capturing mode. An image captured by the image sensor may be processed by the controller 130 or a separate image processor (not shown).

An image frame processed by the camera 161 may be stored in the storage 170 or transmitted to an external device through the communicator 120. Two or more cameras 161 may be included according to the configuration of the mobile device 10.

The microphone 162 receives an external sound signal and processes the external sound into electrical sound data. For example, the microphone 162 may receive a sound signal from an external device or a speaker. The microphone 162 may use various noise reduction algorithms to remove noises generated during a process of receiving the external sound signal.

The storage 170 may store programs for processing and controlling the controller 130 and store input/output data (e.g., applications, contents, time-specific information of external devices, and addresses).

The storage 170 may include at least one type of storage medium selected from a flash memory type, a hard disk type, a multimedia card micro type, card type memory (e.g., SD or XD memory), random access memory (RAM), static random access memory (SRAM), read-only memory (ROM), electrically erasable programmable read-only memory (EEPROM), programmable read-only memory (PROM), magnetic memory, a magnetic disk, or an optical disk. Alternatively, the mobile device 10 may operate a web storage or a cloud server that performs the function of the storage 170 through the Internet.

Programs stored in the storage 170 may be classified into a plurality of modules according to functions thereof, e.g., a user interface (UI) module 171, a touch screen module 172, and a notification module 173.

The UI module 171 may provide a specialized UI, GUI, or the like interworking with the mobile device 10 according to applications.

The touch screen module 172 may detect a touch gesture of the user on the touch screen and transmit information on the touch gesture to the controller 130. The touch screen module 172 according to an embodiment may recognize and analyze a touch code. The touch screen module 172 may be configured as a separate hardware component including a controller.

Various sensors may be provided inside or near the touch screen to detect a touch or a proximity touch on the touch screen. As an example of the sensor to detect a touch on the touch screen, a tactile sensor may be used. The tactile sensor is a sensor configured to detect a contact of an object to the extent that a person feels. The tactile sensor may obtain various information such as roughness of a contact surface, rigidity of a contact object, and temperature of a contact point.

In addition, as an example of the sensor to detect a touch on the touch screen, a proximity sensor may be used.

The proximity sensor refers to a sensor to detect an object approaching a predetermined detection surface or presence or absence of an object nearby using an electromagnetic field or infrared light without a mechanical contact. Examples of the proximity sensor include a transmissive type photoelectric sensor, a direct reflective type photoelectric sensor, a mirror reflective photoelectric sensor, a high-frequency oscillation-type proximity sensor, a capacitance type proximity sensor, a magnetic type proximity sensor, and an infrared ray proximity sensor.

The touch gesture of the user may include tap, touch-and-hold, double tap, drag, pan, flick, drag-and-drop, swipe, and the like.

The notification module 173 may generate a signal for notifying occurrence of an event of the mobile device 10. Examples of the even occurring in the mobile device 10 may include receipt of a call signal, receipt of a message, input of a key signal, and notification of a schedule.

For example, the notification module 173 may output a notification signal in the form of a video signal via the display 150, output the notification signal in the form of an audio signal via the sound output device 152, and/or output the notification signal in the form of a vibration signal via the vibration motor 153.

The controller 130 controls the overall operation of the mobile device 10. For example, the controller 130 may control the sensor part 110, the communicator 120, the output device 151, the user input device 140, the A/V input device 160, the memory 170, and the like by executing programs stored in the storage 170.

The controller 130 may determine the position of the mobile device 10 or the position of the anchor device 3 as reference coordinates.

The controller 130 may determine relative position information of the reference coordinates and the input device 11 based on signals transmitted and received between the input device 11 and the communicator.

In addition, the controller 130 may determine the movement trajectory of the input device 11 based on the relative position information and the motion information.

The controller 130 may display the movement trajectory to the display and/or transmit the movement trajectory to the output device.

The controller 130 may form spatial coordinates by determining a position of the anchor device 3 as reference coordinates based on signals transmitted and received between the anchor device 3 and the communicator.

The communicator 120 may be provided to communicate with the output device configured to output an image.

The controller 130 may be provided to visualize the movement trajectory and output the visualized resultant to the display device.

The output device 2 may include at least one sensor configured to obtain depth position information of the input device 11.

Also, the controller 130 may determine three-dimensional spatial coordinates including reference coordinates using depth position information of the device obtained by the output device.

Also, the controller 130 visualizes (transforms into a visual form) the movement trajectory on the three-dimensional spatial coordinates and transmits the visualized resultant to the display device.

Also, the controller 130 may determine relative position information of the mobile device 10 and the input device 11 and output the information to the display.

At least one component may be added or deleted corresponding to performance of the components of the electronic device 1 and the mobile device 10 illustrated in FIGS. 2 and 3. In addition, it will be readily understood by those skilled in the art that mutual positions of the components may be changed to correspond to performance or structure of a system.

The components illustrated in FIGS. 2 and 2 refer to a software component and/or a hardware component such as field programmable gate array (FPGA) and application specific integrated circuit (ASIC).

Figure 4B:
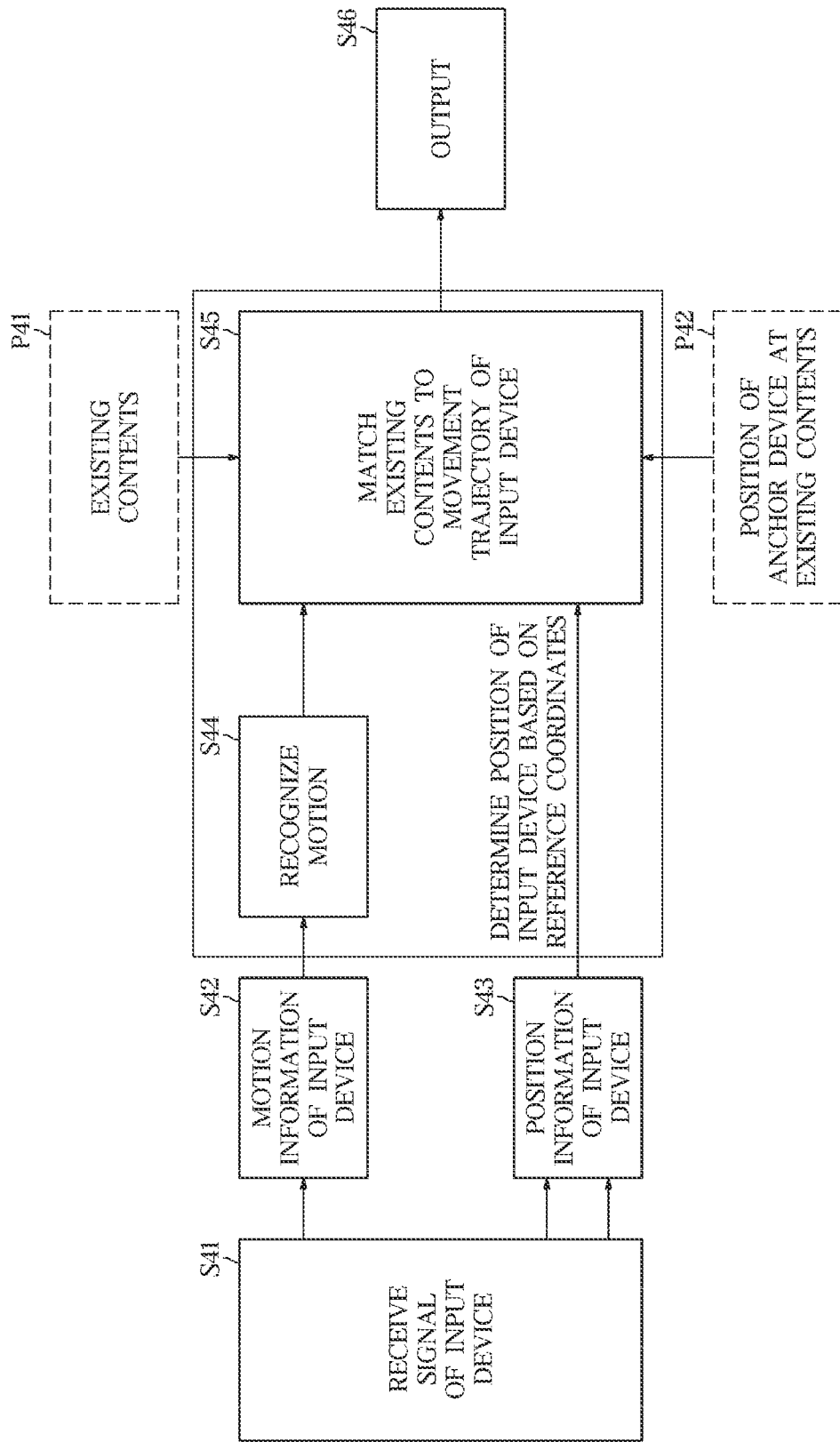

FIGS. 4A and 4B are diagrams for describing an operation of obtaining a motion trajectory of the input device 11 according to an embodiment.

Referring to 4A, the electronic device may obtain a motion trajectory of the input device 11 by calculating the position of the input device 11 with respect to the writing plane and the anchor device.

The anchor device may be provided as a device including an accelerometer, a gyroscope, and/or a magnetometer, or the mobile device 10 may also be used as the anchor device according to an embodiment.

In FIG. 4A, the mobile device 10 implements the operation of the anchor device.

That is, the anchor device may be provided as a device collecting and processing a motion of the input device 11 at a relative position with respect to reference coordinates P4.

The mobile device 10 may determine a motion trajectory based on the above-described motion sensor(s) included in the input device and a RGB camera, a depth camera, and a Radar system, or the like provided at the output device or the mobile device 10.

That is, the mobile device 10 may determine one planar space S4a based on the reference coordinates P4 and input the plane and a motion trajectory M4a of the input device 11 to output the motion trajectory M4a on the output device or the mobile device 10.

The mobile device 10 may determine the motion trajectory of the input device 11 based on a distance r4 obtained by using a communication time between the mobile device 10 and the input device 11 and angles α4 of transmitted and received signals (an angle of arrival (AoA) and an angle of departure (AoD)).

Referring to FIGS. 4A and 4B, motion information of the input device 11 may be processed in a different route from that of position information of the input device 11.

Specifically, the motion information of the input device 11 may be obtained by the accelerometer and/or the gyro sensor of the input device 11 (S41) and may be recognized by the mobile device 10 as motion information (S42).

The mobile device 10 may determine the position of the input device 11 based on reference coordinates (S43).

According to an embodiment, when the position of the input device 11 is determined, a communication signal measured between the input device 11 and the mobile device 10 or the output device or a signal obtained by the RGB camera or the depth camera provided at the output device may be used in addition to the signals obtained by the sensor(s) provided at the input device 11.

Particularly, the communication signal may be measured based on a time of communication between the mobile device 10 and the input device 11 (TOA), an angle of a received signal (an angle of arrival (AoA)), and an angle of a transmitted signal (an angle of departure (AoD)).

The mobile device 10 may obtain a movement trajectory of the input device 11 based on the motion information of the input device 11 obtained as described above (S44) and the position information of the input device 11.

That is, in the present disclosure, the movement trajectory may be obtained by additionally using the obtained position information of the input device 11 obtained by determining the reference coordinates in addition to the motion information obtained by the sensors embedded in the input device 11.

The input of the input device 11 may generally be output on predetermined contents (P41).

Therefore, the mobile device 10 may match the movement trajectory to the contents in consideration of the position of predetermined contents and output both the movement trajectory and the contents (S45 and P42).

That is, the mobile device 10 may output the movement trajectory of the input device 11 determined based on the above-described operation on the contents such as, for example, existing documents or presentation materials (S46).

The movement trajectory may be output on the display provided at the mobile device 10 or on the output device as described above.

The output device may be provided as AR/VR glasses, a TV screen, a projector, a tablet PC, a display apparatus, and the like capable of outputting the contents.

The mobile device 10 may determine the position of the input device 11 in the two-dimensional (2D) or 3D space based on the reference coordinates corresponding to the anchor device connected to the contents.

The operation of the present disclosure is conceptually described above in FIGS. 4A and 4B and embodiments of the above-described operation will be described in more detail.

Figure 5A:
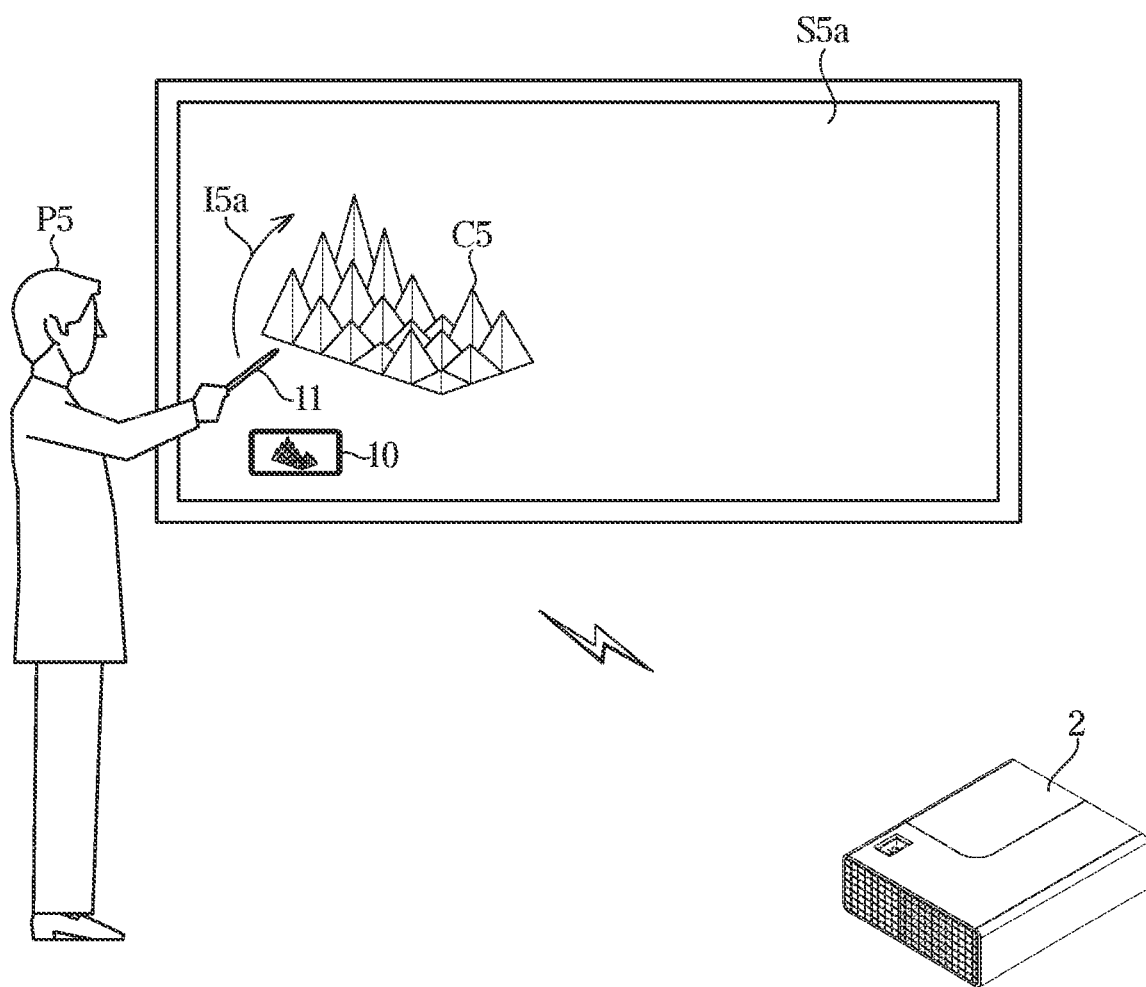
Figure 5B:
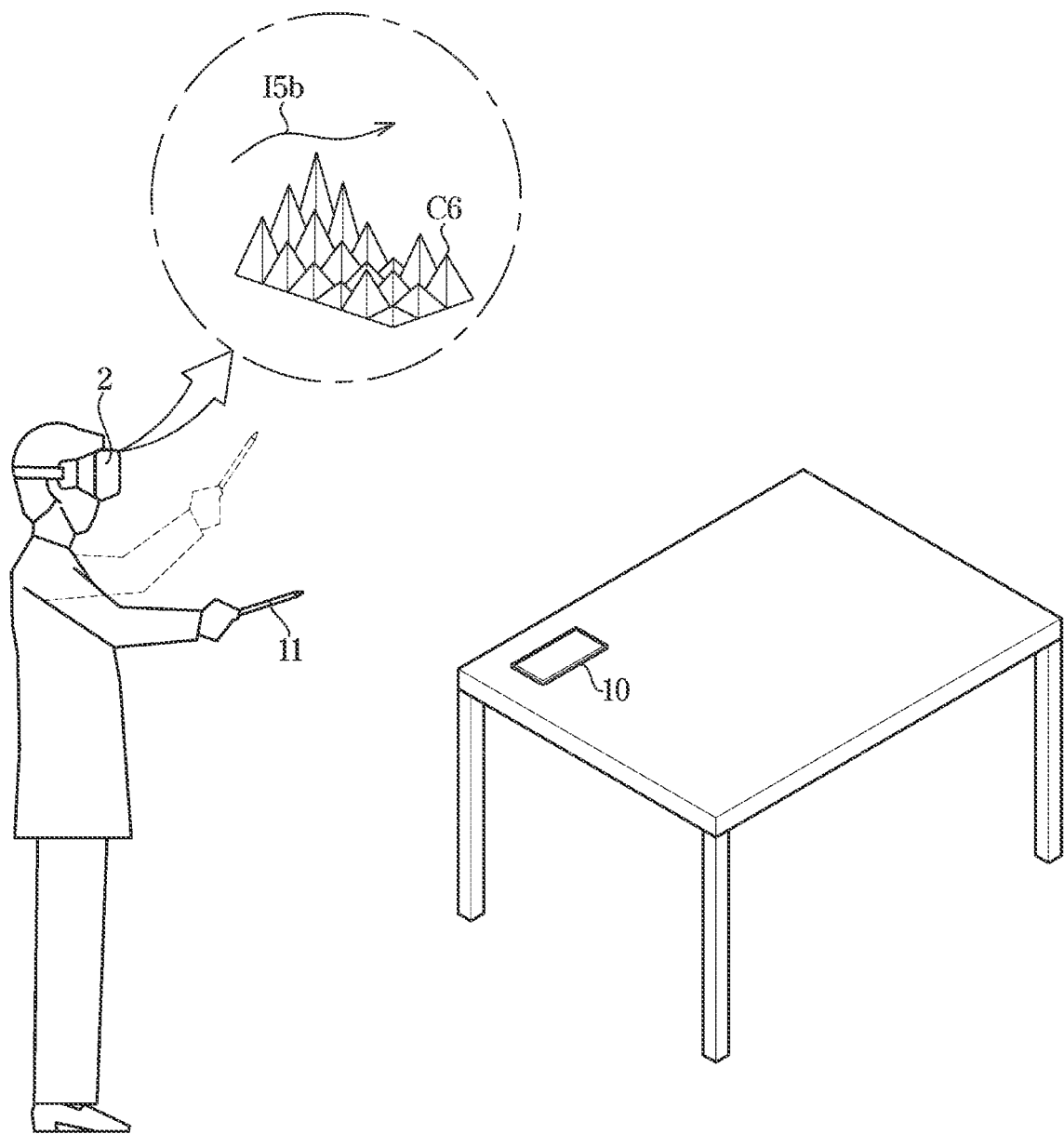

FIGS. 5A and 5B are diagrams for describing an operation of outputting a motion trajectory of the input device 11 in a two-dimensional operation according to an embodiment.

FIG. 5A shows an embodiment in which the anchor device is provided as the mobile device 10 and the output device is provided as a projector.

Therefore, the reference coordinates may be determined as coordinates of the mobile device 10.

Also, the mobile device 10 may determine a planar space S5a based on the position of the mobile device 10.

The mobile device 10 may determine a plane on which the mobile device 10 is located and obtain motion information of the input device 11 based on the plane.

The mobile device 10 may output prestored contents C5 via a projector 2.

FIG. 5A shows that the mobile device 10 output a graph through the projector 2.

In addition, the mobile device 10 may output, in a 2D manner, a movement trajectory I5a (e.g., an arrow image as shown in FIG. 5A) of the input device 11 obtained from the position information and the motion information of the input device 11 together with the existing contents C5.

The existing contents C5 and motion information of the input device 11 may simultaneously be output by an application run in the mobile device 10.

According to an embodiment, an application run in the mobile device 10 may be provided to edit a document based on motion information of the input device 11.

The application may perform an operation of overlapping the existing contents C5 and motion information (e.g., the movement trajectory I5a) of the input device 11.

Specifically, the application run in the mobile device 10 may output the existing contents C5 on one layer and the motion information of the input device 11 on an upper layer of the layer on which the contents C5 are output.

By allocating the image (or the motion information) being output to a separate different layer, the application of the mobile device 10 may simultaneously output both the contents C5 and the movement trajectory I5a.

FIG. 5B illustrates that the mobile device 10 outputs contents C6 via AR glasses 2. FIG. 5B shows an embodiment in which the output device 2 is provided as AR glasses. The electronic device illustrated in FIG. 5B may receive 3D motion information of the input device.

In FIG. 5B, the reference coordinates may be determined as coordinates of the mobile device 10.

In addition, the mobile device 10 may determine a 3D space based on the position of the mobile device 10. The mobile device 10 may determine the position of the mobile device 10 as a reference position and obtain motion information of the input device 11 based on the reference position.

The mobile device 10 may output prestored contents C6 via the AR glasses 2. In addition, the mobile device 10 may output, in a 3D manner, a movement trajectory I5b (e.g., an arrow image) of the input device 11 obtained from the position information and the motion information of the input device 11 together with the existing contents C6.

FIG. 5C shows that the anchor device is provided as the mobile device 10 and the mobile device 10 is located on a top surface S5b of a desk.

The mobile device 10 may determine the top surface S5b of the desk as a writing plane S5b and move the input device 11 on the top surface of the desk.

The mobile device 10 may determine a movement trajectory I5c of the input device 11 using position information and motion information of the input device 11.

The mobile device may output the movement trajectory I5c input by the user using the input device 11 on the output device.

In FIG. 5C, the output device may be provided as an AR device according to an embodiment, and the mobile device 10 may output an image on the mobile device 10 and the AR device. In this case, the mobile device 10 may output, via the AR device to the top surface S5b of the desk, both the image on the mobile device 10 and the input movement trajectory I5c of the input device 11.

In the 2D and/or 3D operation described in FIGS. 5A to 5C, the operation of outputting the movement trajectory of the input device 11 is merely an embodiment of the present disclosure, and thus a separate anchor device may be provided and types of the output device are not limited.

Figure 6:
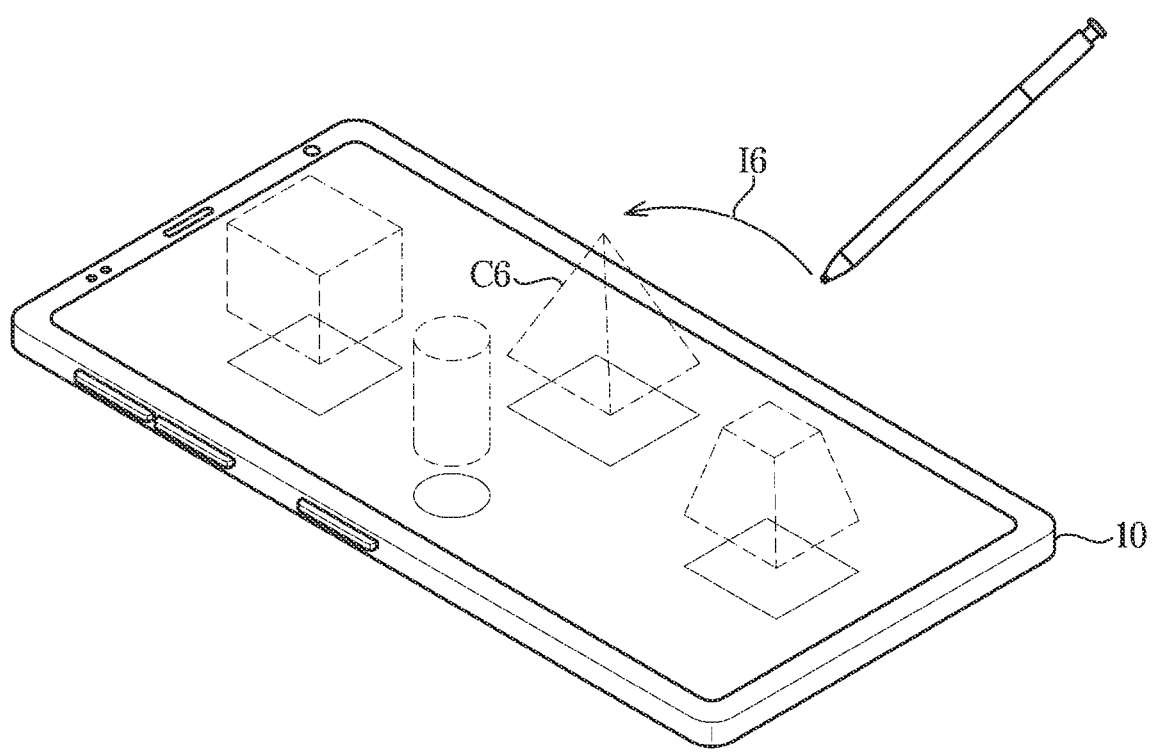
FIG. 6 is a diagram for describing an operation of outputting a motion trajectory of an input device in a three-dimensional space according to an embodiment.

FIG. 6 is a diagram for describing an operation of outputting a motion trajectory of the input device 11 in a three-dimensional space according to an embodiment.

Referring to FIG. 6, the mobile device 10 outputs a hologram C6 on a display.

In FIG. 6, the anchor device is provided as the mobile device 10 and the output device may be provided as an AR device (not shown).

The mobile device 10 may receive depth information of the input device 11 from the output device.

That is, the hologram may be formed as a 3D image and position information of the input device 11 may be generated by the mobile device 10 and received by the AR device that is the output device.

The AR device may obtain depth information of the input device 11 and transmit the depth information to the mobile device 10.

In this case, the mobile device 10 may obtain a 3D position and motion of the input device 11 and output a 3D movement trajectory 16.

Specifically, the mobile device 10 and the output device may obtain the movement trajectory based on the obtained motion information of the input device and the output device may output the movement trajectory.

In FIG. 6, the user generated a movement trajectory 16 indicating a particular portion of the hologram using the input device 11.

That is, the mobile device 10 may determine the position of the mobile device 10 as reference coordinates and output both the hologram C6 output on the mobile device 10, and the movement trajectory 16 input by the user via the input device 11 on the AR glasses.

The hologram C6 may correspond to the existing contents output by the mobile device, and the operation of outputting the existing contents and the trajectory is described above in detail.

The operation described above in FIG. 6 is merely an embodiment of the 3D movement trajectory of the input device 11 and the operation of outputting the 3D movement trajectory of the input device 11 is not particularly limited.

FIG. 7 is a diagram for describing an operation of simultaneously outputting an image output by the mobile device 10 and a motion trajectory of the input device 11 according to an embodiment.

Referring to FIG. 7, the mobile device 10 may determine spatial coordinates including contents image C7 output by the mobile device 10.

FIG. 7 illustrates that a surface S7 in contact with the mobile device 10 is determined as a reference plane to receive motion information of the input device.

In FIG. 7, the mobile device 10 is provided as a tablet PC, and particular contents are output on a display of the mobile device 10.

The mobile device 10 may determine mutual position relations between the contents image C7 and the movement trajectory corresponding to relative position relations between the mobile device 10 and the input device 11 and output the contents image C7 and the motion trajectory (e.g., arrows between ①, ②, ③, ④, and ⑤ in FIG. 7) on the mobile device 10 and the output device.

FIG. 7 illustrates that a user near the mobile device 10 forms a movement trajectory 17 via the input device 11.

In FIG. 7, the output device may be provided as AR glasses (not shown), and the existing contents C7 of the mobile device 10 and the movement trajectory 17 may be simultaneously output on the AR glasses in consideration of mutual position relations therebetween.

The operation described in FIG. 7 is merely an embodiment of the present disclosure and the operation of simultaneously outputting the contents output by the mobile device 10 and the movement trajectory input by the user using the input device 11 is not particularly limited.

Figure 8:
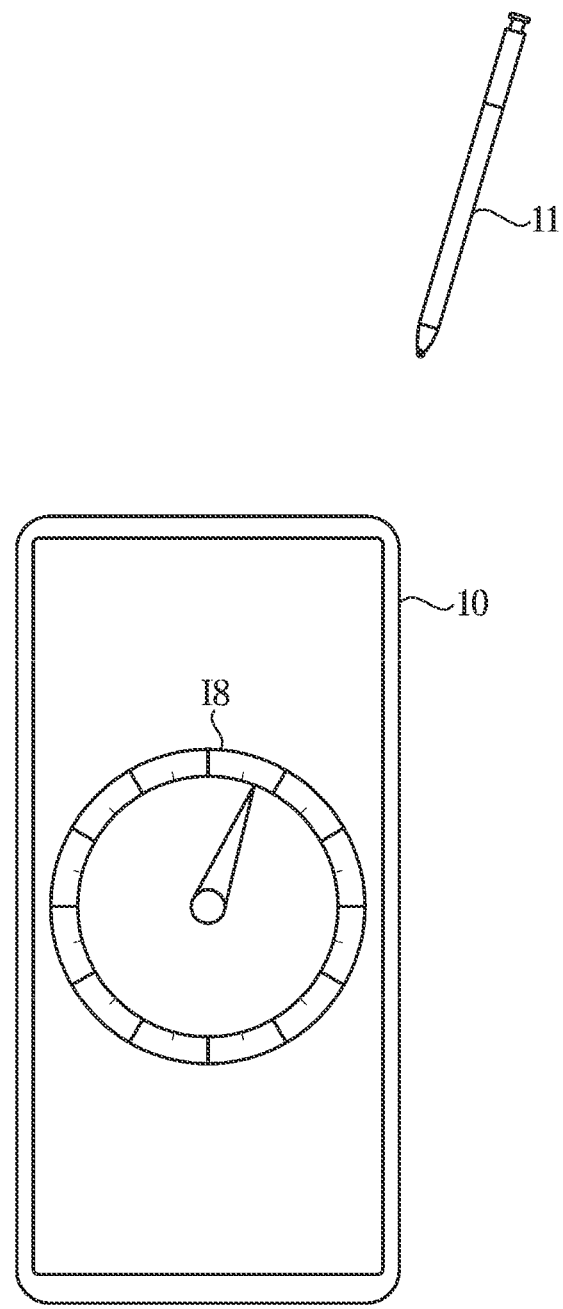
FIG. 8 is a diagram for describing an operation of outputting a position of an input device on a mobile device according to an embodiment.

FIG. 8 is a diagram for describing an operation of outputting a position of the input device 11 on the mobile device 10 according to an embodiment.

Referring to FIG. 8, the mobile device 10 may determine a relative position of the input device 11 with respect to the mobile device 10 and output information (e.g., an image of a compass 18) indicating the determined relative position on the mobile device 10.

The mobile device 10 may communicate with the input device 11 as described above and a relative position of the mobile device 10 may be determined by using arrival times, arrival angles, and departure angles of communication signals between the mobile device 10 and the input device 11.

In FIG. 8, the input device is located above a right-hand side of the mobile device 10 and the mobile device 10 may output this direction information I8 on a display.

Although a direction of the input device 11 with respect to the mobile device 10 is output in FIG. 8, a distance from the input device 11 may also be calculated and output, and an output format is not limited.

FIG. 9 is a flowchart illustrating a method of operating an electronic device according to an embodiment.

Referring to FIG. 9, the mobile device 10 may determine reference coordinates based on a position of the mobile device 10 or the anchor device (1001).

The mobile device 10 may receive position information and motion information of the input device 11 with respect to the reference coordinates (1002).

Then, the movement trajectory of the input device 11 may be determined based on the position information and the motion information of the input device 11 (1003).

In addition, the mobile device 10 may output the movement trajectory on the mobile device 10 (e.g., a display of the mobile device 10) and on an output device such as AR glasses (1004).

When the mobile device 10 outputs the movement trajectory, the predetermined contents may be output together therewith as described above.

The aforementioned embodiments may be embodied in the form of a recording medium storing instructions executable by a computer. The instructions may be stored in the form of program codes and perform the operation of the disclosed embodiments by creating a program module when executed by a processor. The recording medium may be embodied as a computer readable recording medium.

The computer readable recording medium includes all types of recording media that store instructions readable by a computer such as read only memory (ROM), random access memory (RAM), magnetic tape, magnetic disc, flash memory, and optical data storage device.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

The example embodiments of the present disclosure have been shown and described above with reference to the accompanying drawings. It will be understood by those of ordinary skill in the art that the present disclosure may be modified into other detailed forms without changing the technical principle or essential features of the present disclosure. However, the disclosed embodiments are illustrative and the scope of the present disclosure is not limited thereby.

What is claimed is:

1. An electronic device comprising:
an input device; and
a mobile device configured to communicate with the input device,
wherein the mobile device is further configured to:
determine a position of the mobile device or a position of a first external device as reference coordinates;
receive relative position information of the input device, with respect to the reference coordinates, and motion information of the input device;
determine a movement trajectory of the input device based on the relative position information and the motion information; and
display the movement trajectory or transmit the movement trajectory to a second external device, and
wherein the mobile device is further configured to determine the movement trajectory of the input device based on a distance obtained by using a communication time between the mobile device and the input device, and an angle of arrival (AoA) of a signal received from the input device and an angle of departure (AoD) of a signal transmitted to the input device.

2. The electronic device of claim 1, wherein the mobile device is further configured to:
determine at least one planar space comprising the reference coordinates; and
determine the movement trajectory of the input device based on the relative position information and the motion information on the at least one planar space.

3. The electronic device of claim 1, wherein the mobile device is further configured to determine the position of the first external device as the reference coordinates, determine spatial coordinates including the reference coordinates, and display or transmit the movement trajectory based on the spatial coordinates.

4. The electronic device of claim 1, wherein the mobile device is further configured to generate a visual form of the movement trajectory, and output, to the second external device, the visual form of the movement trajectory.

5. The electronic device of claim 1, wherein the second external device comprises at least one sensor configured to obtain depth position information of the input device, and
wherein the mobile device is further configured to:
determine three-dimensional spatial coordinates including the reference coordinates; and
generate, using the depth position information, a visual form in a three-dimensional manner of the movement trajectory, and output, to the second external device, the visual form of the movement trajectory on the three-dimensional spatial coordinates.

6. The electronic device of claim 1, wherein the mobile device is further configured to:
determine spatial coordinates including an image of a content that is output by the mobile device;
determine a position relation between the image of the content and the movement trajectory corresponding to a relative position relation between the mobile device and the input device; and
simultaneously output the image of the content and the movement trajectory on at least one of the mobile device or the second external device.

7. The electronic device of claim 1, wherein the mobile device is further configured to determine the relative position information of the input device based on signals transmitted and received between the mobile device and the input device, and configured to output the determined relative position information on the mobile device.

8. An electronic device communicatively coupled with an input device, the electronic device comprising:
a display;
a communication circuit configured to receive motion information of the input device from the input device; and
a controller configured to:
determine a position of the electronic device or a position of an anchor device as reference coordinates;

determine relative position information of the input device, with respect to the reference coordinates, based on signals transmitted and received between the input device and the communication circuit;

determine a movement trajectory of the input device based on the relative position information and the motion information; and display the movement trajectory on the display or transmit the movement trajectory to an output device, wherein the controller is further configured to determine the movement trajectory of the input device based on a distance obtained by using a communication time between the communication circuit and the input device, and an angle of arrival (AoA) of a signal received from the input device and an angle of departure (AoD) of a signal transmitted to the input device.

9. The electronic device of claim 8, wherein the communication circuit is further configured to receive a direction signal from the anchor device, the direction signal indicating a direction of the input device with respect to the anchor device, and wherein the controller is further configured to determine the position of the anchor device as the reference coordinates based on the direction signal and signals transmitted and received between the anchor device and the communication circuit.

10. The electronic device of claim 8, wherein the controller is further configured to control the display to display a visual form of the movement trajectory.

11. The electronic device of claim 10, wherein the controller is further configured to:

determine three-dimensional spatial coordinates comprising the reference coordinates, and control the display to display the visual form of the movement trajectory.

12. The electronic device of claim 10, wherein the controller is further configured to determine the relative position information of the input device and output the determined relative position information on the display.

13. A method of controlling an electronic device, the method comprising:

determining a position of a mobile device or a position of a first external device as reference coordinates;

receiving relative position information of an input device, with respect to the reference coordinates, and motion information of the input device;

determining a movement trajectory of the input device based on the relative position information and the motion information; and displaying the movement trajectory or transmitting the movement trajectory to a second external device, wherein the determining the movement trajectory of the input device comprises determining the movement trajectory of the input device based on a distance obtained by using a communication time between the electronic device and the input device, and an angle of arrival (AoA) of a signal received from the input device and an angle of departure (AoD) of a signal transmitted to the input device.

14. The method of claim 13, wherein the determining of the movement trajectory of the input device comprises:

determining at least one planar space including the reference coordinates; and determining the movement trajectory based on the relative position information and the motion information on the at least one planar space.

15. The method of claim 13, wherein the determining of the reference coordinates comprises determining a position of the first external device as the reference coordinates and determining spatial coordinates including the reference coordinates, and wherein the displaying or the transmitting the movement trajectory is performed based on the spatial coordinates.

16. The method of claim 13, wherein the transmitting of the movement trajectory to the second external device comprises generating a visual form of the movement trajectory and transmitting the visual form of the movement trajectory to the second external device.

17. The method of claim 13, wherein the transmitting of the movement trajectory to the second external device comprises:

determining three-dimensional spatial coordinates including the reference coordinates; and generating a visual form of the movement trajectory on the three-dimensional spatial coordinates and transmitting the visual form of the movement trajectory to the second external device.

18. The method of claim 13, further comprising:

determining spatial coordinates including an image of a content that is output by the mobile device;

determining a position relation between the image of the content and the movement trajectory corresponding to a relative position relation between the mobile device and the input device; and simultaneously outputting the image of the content and the movement trajectory on at least one of the mobile device or the second external device.

19. The method of claim 13, further comprising determining the relative position information of the input device based on signals transmitted and received between the mobile device and the input device, and outputting the relative position information on the mobile device.

* * * * *